(12) United States Patent
Toyohara (10) Patent No.: US 6,175,444 B1
(45) Date of Patent: Jan. 16, 2001

(54) BI-DIRECTIONAL OPTICAL AMPLIFIER (75) Inventor: Atsushi Toyohara, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/203,587

(22) Filed: Dec. 2, 1998

(30) Foreign Application Priority Data

Dec. 2, 1997 (JP) .................................................. 9-331975

(51) Int. Cl.⁷ ...................................................... H01S 3/00
(52) U.S. Cl. ........................................... 359/341; 154/174
(58) Field of Search ................... 359/341, 154, 359/174

(56) References Cited

U.S. PATENT DOCUMENTS

| | | | |
|---|---|---|---|
| 5,548,438 | * 8/1996 | Delavaux | 359/341 |
| 5,652,675 | * 7/1997 | Shibuya | 359/341 |
| 5,742,416 | * 4/1998 | Mizrahi | 359/134 |
| 5,812,306 | * 9/1998 | Mizrahi | 359/341 |
| 5,867,306 | * 2/1999 | Isshiki | 359/341 |
| 5,875,054 | * 2/1999 | Onoda et al. | 359/341 |

FOREIGN PATENT DOCUMENTS 6-342950 * of 1994 (JP) .

* cited by examiner

Primary Examiner—Mark Hellner
(74) Attorney, Agent, or Firm—McGinn & Gibb, P.C.

(57) ABSTRACT

A bi-directional optical amplifier according to the present invention comprises: an optical circulator with four ports; a first and second optical amplification fibers, each optically amplifying an entered signal light with the help of a pumping light; two pumping light sources, each outputting a pumping light; two optical couplers; and a wave-length selection/reflection filter which selectively reflects a specific wave-length of a signal light. The optical circulator, comprising four ports, a first to fourth ports, outputs entered lights one after another to each adjacent port. The first and second optical amplification fibers are connected to the first and third ports of the optical circulator, respectively.

24 Claims, 6 Drawing Sheets

BI-DIRECTIONAL OPTICAL AMPLIFIER

BACKGROUND OF THE INVENTION

1. Field of the Invention

The present invention relates to a bi-directional optical amplifier optically amplifying a bi-directionally propagating signal light.

2. Description of the Related Art

A rare-earth element added optical fiber, made by adding a rare-earth element such as the Erbium(Er) to silica ($SiO_2$) optical fiber, is well-known as an optical amplification element, which optically amplifies a damped bi-directional signal light and transmits it a long distance. In recent years, the optical amplifier with the optical amplification element has been used in place of the amplifier with a function of making a photoelectric conversion.

In the optical communication systems, a bi-directional optical communication or a bi-directional reception and transmission of a signal light are both made. In the bi-directional optical communication, in order to more efficiently use the optical transmission line, the bi-directional optical communication system is available where identical or different wave-lengths of signal lights are bi-directionally propagated along an optical fiber.

When an optical amplifier with the above optical amplification element is applied to the bi-directional optical communication system in order to amplify optically, a bi-directional optical amplifier is necessary. The conventional bi-directional optical amplifiers have incorporated a technology, for example, the one disclosed in "Japanese Patent Application Laid-open No. Hei-9-18417" or "Japanese Patent Application Laid-open No. Hei-4-62528". The former (Japanese Patent Application Laid-open No. Hei-9-18417) is configured in such a way that EDFs (Erbium Doped Fibers) are connected to four ports in an optical circulator, respectively. On the other hand, the latter (Japanese Patent Application Laid-open No. Hei-4-62528) is configured in such a manner that an optical device, other than the rare-earth element added optical fibers, is connected to the input/output ports of an optical circulator.

However, both the above configurations need a reflection point upon which a signal light can be totally reflected. In addition, an optical filter is required in order to prevent a possible emission of spontaneous emission light at an optical input/output end. Accordingly, its configuration becomes complex, causing an increase of transmission losses.

SUMMARY OF THE INVENTION

Accordingly, the objective of a bi-directional optical amplifier according to the present invention is to decrease the noise factor, allowing an optical transmission of high quality.

A bi-directional optical amplifier according to the present invention is comprised of: an optical circulator with four ports; a first and a second optical amplification fiber; two pumping light sources, each outputting a pumping light; two optical couplers; and a wave-length selection/reflection filter.

The optical circulator according to the present invention comprises four ports of the first to fourth, each sending incoming light one after another to the adjacent port. The first to third optical amplification fibers are connected to the first to third ports of the optical circulator, respectively.

The first optical coupler, connected to the second port of the optical circulator, receives a first signal light(downward signal light) output from the second port. The first optical coupler has a feature to pass the first signal light. On the opposite side of the second port of first optical coupler, a first wave-length selection/reflection unit is prepared to selectively reflect the specific wave-lengths of the first signal light.

The first optical coupler synthesizes a pumping light output from the first pumping light source with the first signal light reflected on the first wave selection/reflection unit, outputting both the resulting first signal light and first pumping light to the second port. The first signal light and first pumping light received at the second port are both output from the third port. The first signal light enters a second optical amplification fiber connected to the third optical input terminal where the first signal light is optically amplified with the help of the first pumping light and then is output.

The second signal light(upward signal light) is also optically amplified with the help of the following units: the second optical coupler; the second pumping light source; the second wave-length selection/reflection unit; and the first optical amplification fiber, in the same manner that the first signal light is optically amplified.

The second optical coupler, connected to the fourth port of the optical circulator, receives the second signal light output from the fourth port. The second optical coupler has a feature to pass the second signal light. On the other side of the fourth port of the second optical coupler, a second wave-length selection/reflection unit is prepared to selectively reflect the specific wave-lengths of the second signal light.

The second optical coupler synthesizes the second pumping light emitted from the second pumping light source with the second signal light reflected on the second wave-length selection/reflection unit, outputting them to the fourth port. The second signal light and the second pumping light received by the fourth port are both output from the first port. The second signal light enters the first optical amplification optical fiber connected to the first light input terminal. It is then optically amplified with the help of the second pumping light. Utilizing the above operation, the first and second signal lights are both successfully, optically amplified.

It is noted that each of the first and second optical amplification fibers is a rare-earth element added optical fiber. The first and second wave-length selection/reflection units used in the optical amplifier according to the present invention are made from a dielectric multi-layered film filter or an optical fiber grating. An optical coupler including the dielectric multi-layered film filter or a fiber fusion-spliced optical coupler is used for the first and second optical couplers.

In the bi-directional optical amplifier according to the present invention with the above configuration, both the locations between the second port of the optical circulator and the first or second wave-length selection/reflection unit, and between the fourth port and the second wave-length selection/reflection unit, on which the first and second optical couplers are prepared, can be changed to other locations between the first port and the first optical amplification fiber, and between the third port and the second optical amplification fiber, respectively. In this case, it is noted that since the optical coupler is prepared on the main transmission line, the first and second signal lights have to be utilized in the same wave-length band.

Moreover, in the bi-directional optical amplifier, according to the present invention, the first and second optical couplers can be located either on the opposite side of both the first optical amplification fiber and the first port, or on the opposite side of the third port of the second optical amplification fiber. In this case, since the optical coupler is also located in the main transmission line, the first and second signal lights need to be utilized in the same wave-length band.

Furthermore, in the bi-directional optical amplifier, according to the present invention, the first and second pumping light sources can be connected to the opposite side of the second or fourth port of the first or second wave-length selection filter. In this configuration, the wave-length selection filters have a feature whereby they selectively reflect the specific wave-lengths of the first and second signal lights. They also pass the specific wave-lengths of the first and second pumping lights. In the above configuration, the first and second optical couplers are unnecessary, allowing it then to be a simple configuration.

BRIEF DESCRIPTION OF DRAWINGS

The above and other objects, features and advantages of the present invention will become more apparent from the following details when taken in conjunction with the accompanying drawings, wherein.

DETAILED DESCRIPTION OF THE PREFERRED EMBODIMENTS

At first, in order to make it easier to understand the idea of the present invention, the conventional bi-directional optical amplifier will be explained hereafter before explaining a bi-directional optical amplifier according to the present invention.

Figure 1:
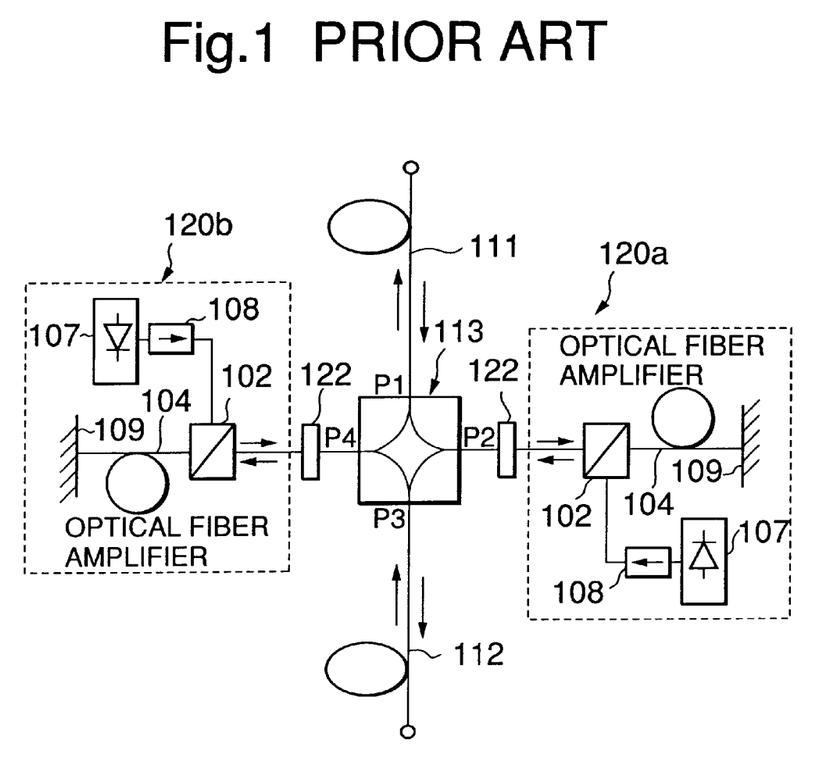
FIG. 1 shows the configuration of a conventional bi-directional optical amplifier.

FIG. 1 shows the configuration of a conventional bi-directional optical amplifier. A signal light entering the port P1(P3) of an optical circulator 113, is emitted from a port P2(P4), entering an optical fiber amplifier 120a (120b). The signal light then enters an optical amplification fiber 104, via an optical coupler 102. The pumping light emitted from a pumping light source 107 also enters the optical amplification fiber 104, where an inverted distribution is formed, via an optical isolator 108 and the optical coupler 102. At the end of the optical amplification fiber 104, a total reflection mirror 109 is prepared. The signal light amplified by the induced emission is reflected by the total reflection mirror 109, and laps in the optical amplification fiber 104, causing its amplification. The amplified signal light passes the optical coupler 102, and returns to the port P2(P4), being emitted from the port P3(P1).

Optical filters 122 are prepared between the port P2 of the optical circulator 113 and the optical coupler 102, and also between the port P4 and the optical coupler 102, respectively. The optical filter 122 eliminates unnecessary wave-length bands of lights from the signal lights before amplification, sending the resulting signal lights to the optical coupler 102. The optical filter 122 also eliminates from the amplified signal lights, the wave-length bands which are unnecessary for transmission through the transmission line.

However, as should be understood by referring to FIG. 1, a reflection point on which a signal light is totally reflected is necessary. In addition, in order to prevent a possible emission of spontaneous emission light from the optical input/output terminal, other optical filters are required. Accordingly, the configuration becomes complex, resulting in an increase of transmission loss.

Next, a bi-directional optical amplifier according to the present invention will be explained hereafter with reference to drawings.

Figure 2:
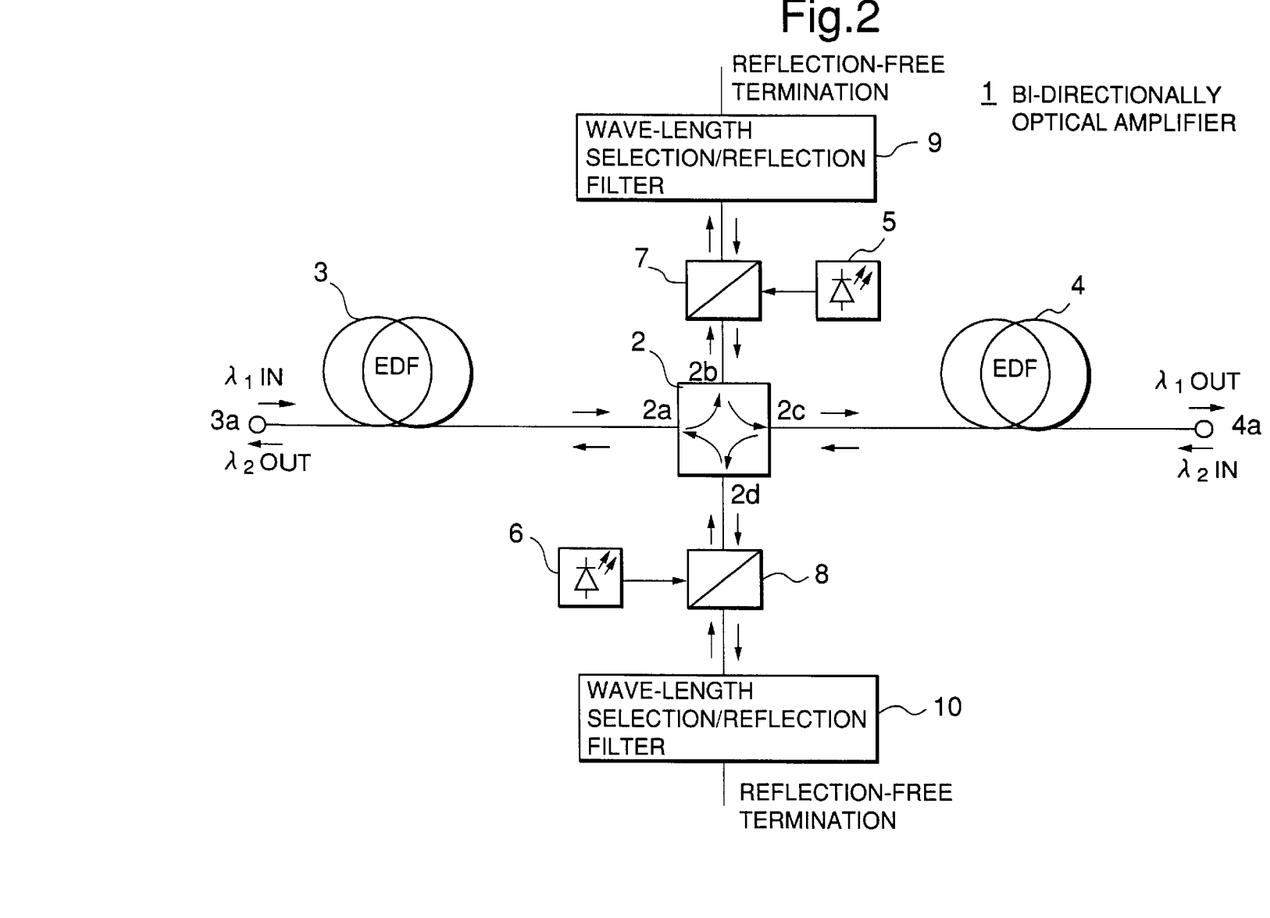
FIG. 2 shows the configuration of a bi-directional optical amplifier according to a first embodiment of the present invention.

FIG. 2 shows the configuration of the bi-directional optical amplifier according to the first embodiment of the present invention. As shown in FIG. 2, the bi-directional optical amplifier according to the present invention is comprised of an optical circulator 2, a rare-earth element added optical fibers 3 and 4, pumping light sources 5 and 6, optical couplers 7 and 8, and wave-length selection/reflection filters 9 and 10.

The optical circulator 2 is a four-port fully circulating type of optical circulator with four ports 2a to 2d. A light entering the first port 2a is sent to the second port 2b. A light entering the first port 2b is sent to the third port 2c. A light entering the first port 2c is sent to the fourth port 2d. Moreover, a light entering the first port 2d is sent to the first port 2a.

The Erbium doped fiber(hereafter, referred to as "EDF") is used for rare-earth element added optical fibers 3 and 4. Those of the optical output ends of respective EDFs are connected to the first ports 2a and 2c of the optical circulator 2, respectively.

Optical couplers 7 and 8 are prepared between the second port 2a of the optical circulator 2 and a wave-length selection/reflection filter 9, and between the fourth port 2d and a wave-length selection/reflection filter 10, respectively. The dielectric multi-film filter or fiber fusion-spliced coupler are used for the optical couplers. The wave-length selection/reflection filters 9 and 10 have a feature which reflect only specific wave-length light, but pass the other wave-length lights. For example, the interfering film filter with dielectric multi-layer film is available for the wave-length selection/reflection filter with the above feature.

Pumping light sources 5 and 6 emit respective pumping lights, which cause corresponding EDFs to enter an excitation state. For example, a signal light of 1.48 $\mu$m in wave-length is emitted from each of them so that the EDFs used in the embodiment to amplify a signal light in a 1.55 $\mu$m wave-length band can be excited. The lights emitted from the pumping light sources 5 and 6 are coupled with a first and second signal light by the optical couplers 7 and 8, respectively.

The optical couplers 7 and 8 receive the first signal light(downward signal light) and second signal light(upward signal light) from the second port 2b and the fourth port 2d, respectively. The first and second signal lights which have been received pass through the optical couplers 7 and 8, being reflected by the wave-length selection/reflection filters 9 and 10, respectively. Lights other than the signal light with specific wave-lengths pass though the wave-length selection/reflection filters 9 and 10, respectively. Wherein, the wave-length selection/reflection filters have already been subjected to a reflectionless termination treatment so that the above lights are not reflected at their ends of the filters, and do not pass through the wave-length selection filter again, and then do not return to the optical couplers 9 and 10, respectively.

Next, the operation of optically amplifying a signal light in the above bi-directional optical amplifier will be explained hereafter. To make it easier to understand, the operation where an unidirectional (downward) signal light enters the optical input/output terminal 3a, and is also transmitted in the right direction in FIG. 2, will be described.

A first signal light (in the 1.55 μm wave-length band ), having entered the optical input/output terminal 3a and then having passed through the EDF 3, enters the first port 2a of the optical circulator 2. It is then output from the second port 2b. The output signal light passes through the optical coupler 7, entering the wave-length selection/reflection filter 9. The wave-length selection/reflection filter 9 selectively reflects no more than the specific wave-lengths of the original signal light. The coupler 9 couples the reflected signal light with the pumping light emitted from the pumping light source 13. On the other hand, lights other than the specific wavelengths pass through the wave-length selection/reflection filter, but do not return to the optical coupler 7.

After passing the optical coupler, the signal light and pumping light enter the second port 2b of the optical circulator 2, and then also enter the EDF 4 via the third port 2c. The EDF 4 excitation occurs by the pumping light output from the pumping light source 5. As a result, the signal light is optically amplified, and output from the EDF 4 to the transmission line.

On the other hand, the similar operation of transmitting the upward signal light in the opposite direction is made. The second signal light(in the 1.55 μm wave-length band) entering the optical input/output terminal 4a passes through the EDF 4, and also then enters the third port 2c of the optical circulator 2. The signal light entering the third port 2c is output from the fourth port 2d of the optical circulator 2, passing through the optical coupler 8. The second signal light enters the wave-length selection/reflection filter 10 where the specific wave-lengths of the original signal light are selectively reflected. The other wave-lengths of light pass through the wave-length selection/reflection filter 10. The reflected signal light is coupled, by the optical coupler 8, with the pumping light output from the pumping light source 6, entering the fourth port 2d of the optical circulator 2. They are then output from the first port 2a. The signal light and pumping light output from the first port 2a, enters the EDF 7.

Accordingly, in the EDF 7 excitation occurs, resulting in the signal light being optically amplified and output from the optical input/output terminal 3a to the transmission line.

With the above procedure, the signal lights entered in both directions are optically amplified and output to the transmission line. In the embodiment, since a wave-length selection filter is used to couple no more than signal light, a spontaneous emission light is prohibited from being output. Moreover, an optical filter is unnecessary between the optical circulator and the optical coupler for eliminating the spontaneous emission light. Therefore, a possible optical transmission loss cannot be increased. In addition, the noise factor can remain low.

Next, a bi-directional optical amplifier according to a second embodiment of the present invention will be explained hereinafter with reference to FIG. 3.

Figure 3:
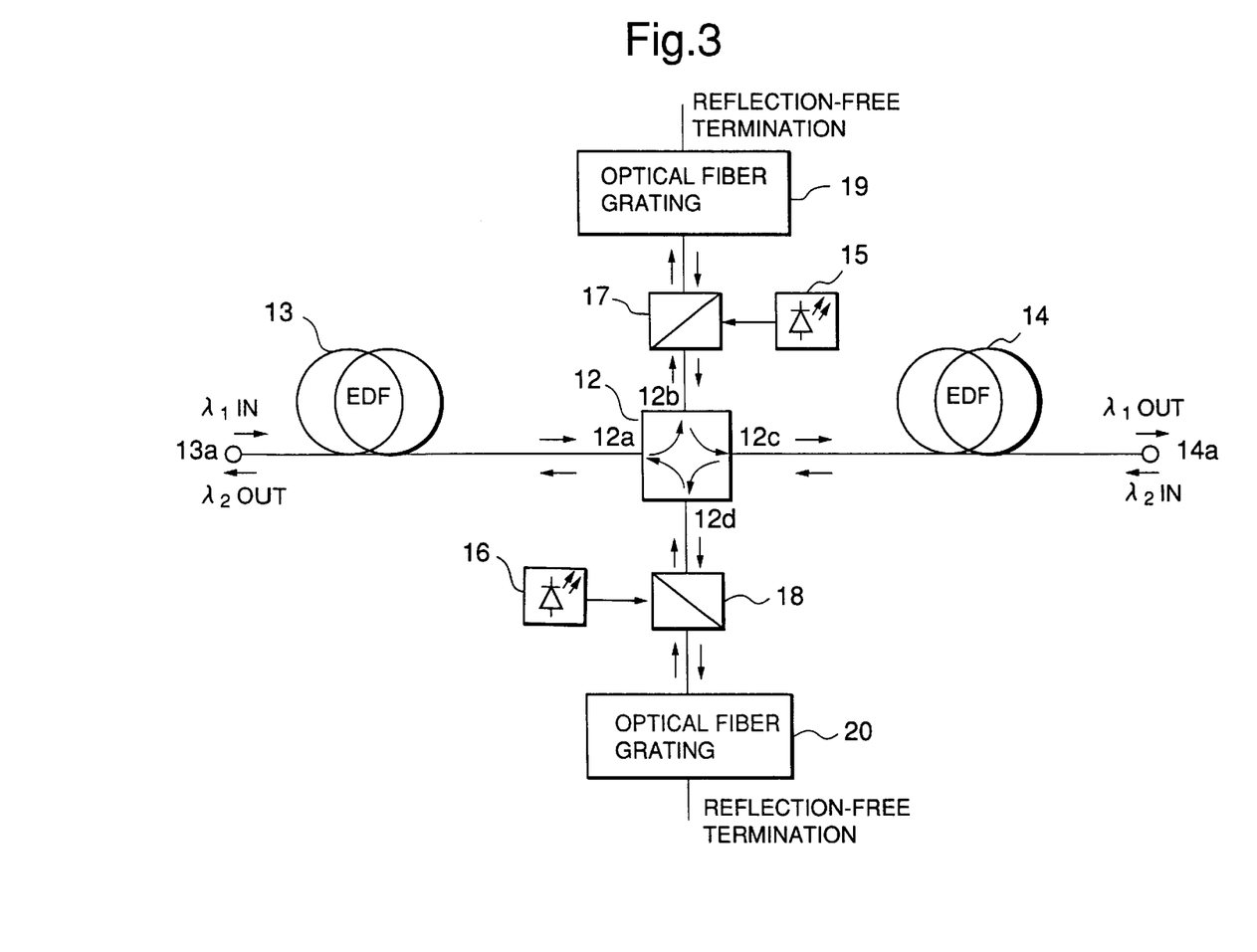
FIG. 3 shows the configuration of a bi-directional optical amplifier according to a second embodiment of the present invention.

FIG. 3 shows the configuration of the bi-direction optical amplifier according to the second embodiment of the present invention. As shown in FIG. 3, the bi-directional optical amplifier according to the present invention is comprised of an optical circulator 12, EDFs 13 and 14, optical couplers 17 and 18, wave-length selection/reflection filters 19 and 20, and pumping light sources 15 and 16.

The bi-directional optical amplifier of the second embodiment has the same configuration as that of the first embodiment except for the difference in wave-length selection/ reflection filters 19 and 20. The wave-length selection/ reflection filters 19 and 20 of the embodiment, connected to optical couplers 17 and 18, are both made from the optical fiber gratings, respectively. As these are the same as the wave-length selection/reflection filters of the first embodiment, they have a feature to selectively reflect specific wave-lengths of lights. The optical fiber gratings are used to selectively reflect a narrow band of the specific wave-lengths of the original signal light.

The bi-directional optical amplifier of the embodiment optically amplifies the signal light from both directions transmitted from the EDF 3 or 4, outputting the resulting amplified signal light from the optical input/output terminal 14a or 13a. Therefore, a large amount of spontaneous emission light cannot be output from the ports, unlike in conventional configurations. Accordingly, a possible optical transmission loss is not increased. In addition, the noise factor remains small.

Next, a bi-directional optical amplifier according to a third embodiment of the present invention will be explained hereinafter.

Figure 4:
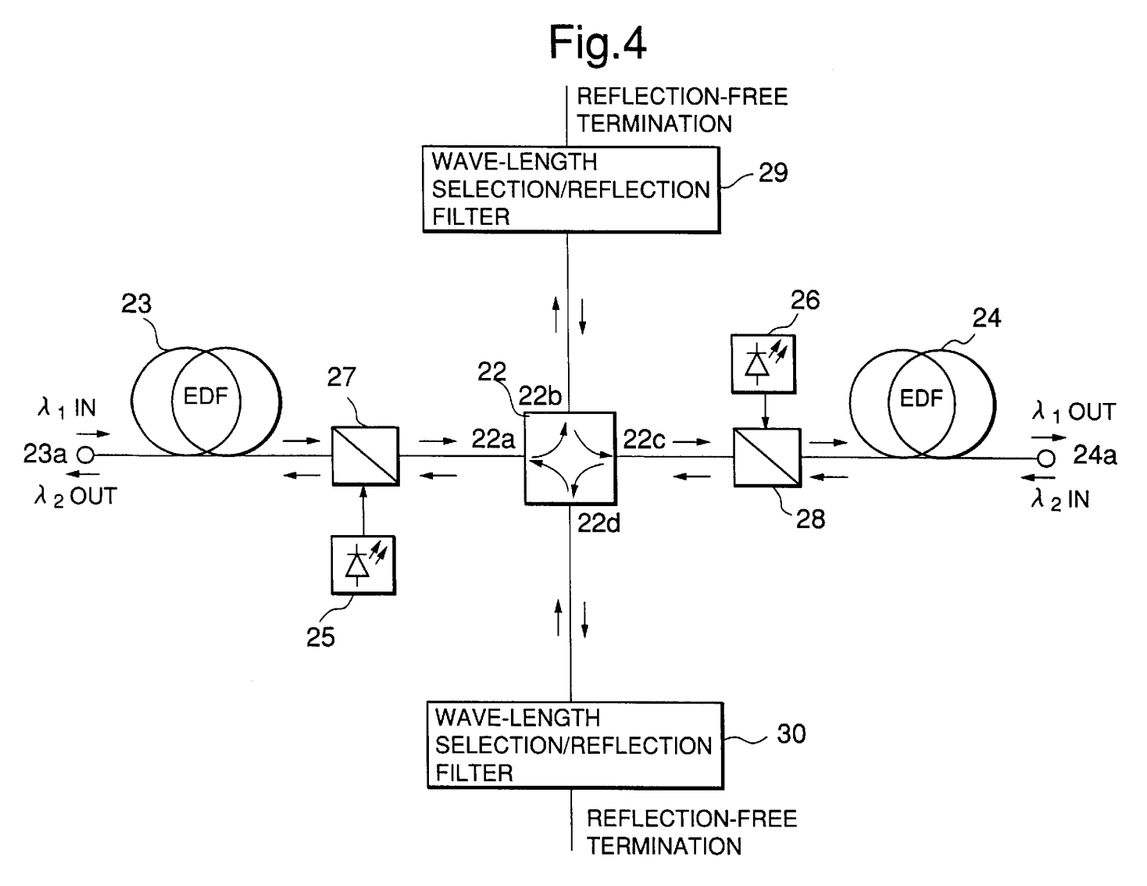
FIG. 4 shows the configuration of a bi-directional optical amplifier according to a third embodiment of the present invention.

FIG. 4 shows the configuration of the bi-directional optical amplifier according to the third embodiment of the present invention. In the description that follows, identical elements to those in FIG. 1 are attached with the same numerals as those used in FIG. 1. Accordingly, their corresponding detailed explanation is omitted.

As shown in FIG. 4, the bi-directional optical amplifier of the embodiment is comprised of an optical circulator 22, EDFs 23 and 24, optical couplers 27 and 28, wave-length selection/reflection filters 29 and 30, and pumping light sources 25 and 26. The bi-directional optical amplifier is basically configured with elements identical to those in the bi-directional optical amplifier of the first embodiment. However, only the locations of the optical couplers 27 and 28 are different.

In the embodiment, the optical couplers 27 and 28 are located between the first port of the optical circulator 2 and the EDF 23, and between the third port and the EDF 24, respectively. The pumping light sources 25 and 26, which are both used for excitation in the EDFs 3 and 4, are connected to the optical couplers 27 and 28, respectively.

Next, the operation of the bi-directional optical amplifier of the embodiment will be explained hereafter. To make it easier to understand, the first signal light(downward signal light) will be explained. The signal light entering the optical input terminal 3a is propagated through the EDF 3. On the other hand, the pumping light emitted from the pumping light source 25 via the optical coupler 7 enters the EDF 3. Excitation in EDF 3 is caused by the pumping light, resulting in optically amplifying the signal light, which propagates through the EDF 3. The optically amplified signal light then enters the first port 22a of the optical circulator 2, being output from the second port 22b.

The optically amplified signal light output from the second port 22b enters the wave-length selection/reflection filter 29. Wherein, the specific wave-lengths of the original signal light are selectively reflected, while a spontaneous emission light passes through, resulting in its elimination. The reflected signal light enters the second port 22b of the optical circulator 2 again, being output from the third port 22c.

The signal light output from the third port 22c passes through the optical coupler 28, entering the EDF 4. On the other hand, the pumping light output from the pumping light source 26 is also coupled by the optical coupler 28, entering the EDF 4. Accordingly, excitement caused by the pumping light in the EDF 4 results in optically amplifying the signal light and outputting the resulting signal light from the optical input/output terminal 4a.

In a similar operation to that described above, the second signal light (upward signal light) entering the optical input/output terminal 24a is optically amplified by the EDF 4, and reflected by the wave-length selection filter 30. The second signal light is then optically amplified by the EDF 3 again, and output from the optical input/output terminal 23a.

In this manner as described above, in the bi-directional optical amplifier of the embodiment, the first and second signal lights entered in both directions are optically amplified by the EDFs 3 and 4, and output, respectively. Even in this case, since the wave-length selection/reflection filters 29 and 30 eliminate a spontaneous emission light, the noise factor is reduced.

Next, a bi-directional optical amplifier according to a fourth embodiment of the present invention will be explained hereafter with reference to FIG. 5.

Figure 5:
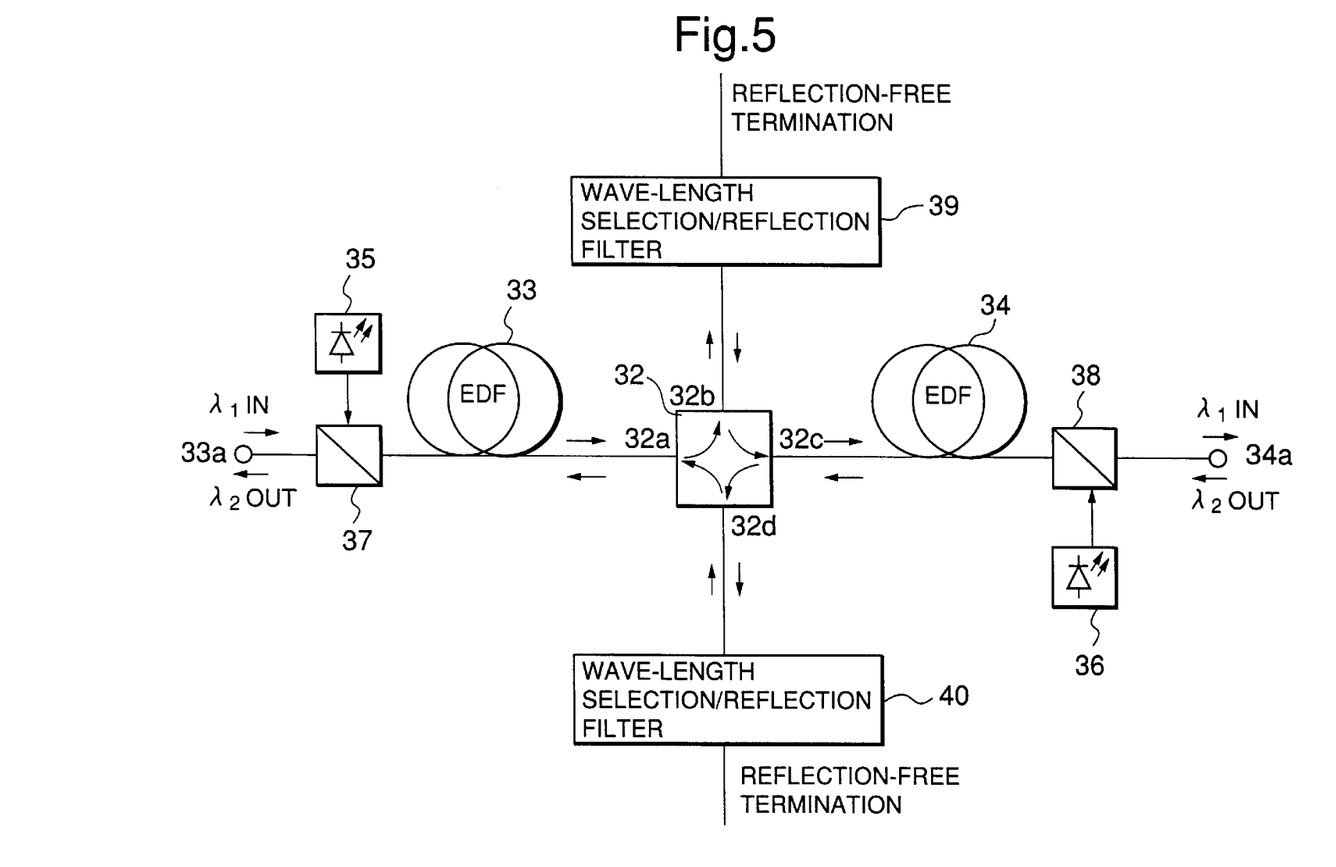
FIG. 5 shows the configuration of a bi-directional optical amplifier according to a fourth embodiment of the present invention.

FIG. 5 shows the configuration of the bi-directional optical amplifier according to the fourth embodiment of the present invention. The bi-directional optical amplifier of the embodiment shown in FIG. 5 is similar to that of the third embodiment. In the third embodiment, the optical couplers 27 and 28 are prepared between the EDF 23 and the optical circulator 22, and between the EDF 4 and the optical circulator 22, respectively. Contrary to this, in this embodiment, the optical couplers 37 and 38 are prepared between the optical input/output terminal 33a and the EDF 33, and between the optical input/output terminal 34a and the EDF 34, respectively. Incoming directions to the EDFs 33 and 34, of the pumping lights output from the respective pumping light sources 35 and 36 are different than those of the third embodiment, but the operation is the same.

Figure 6:
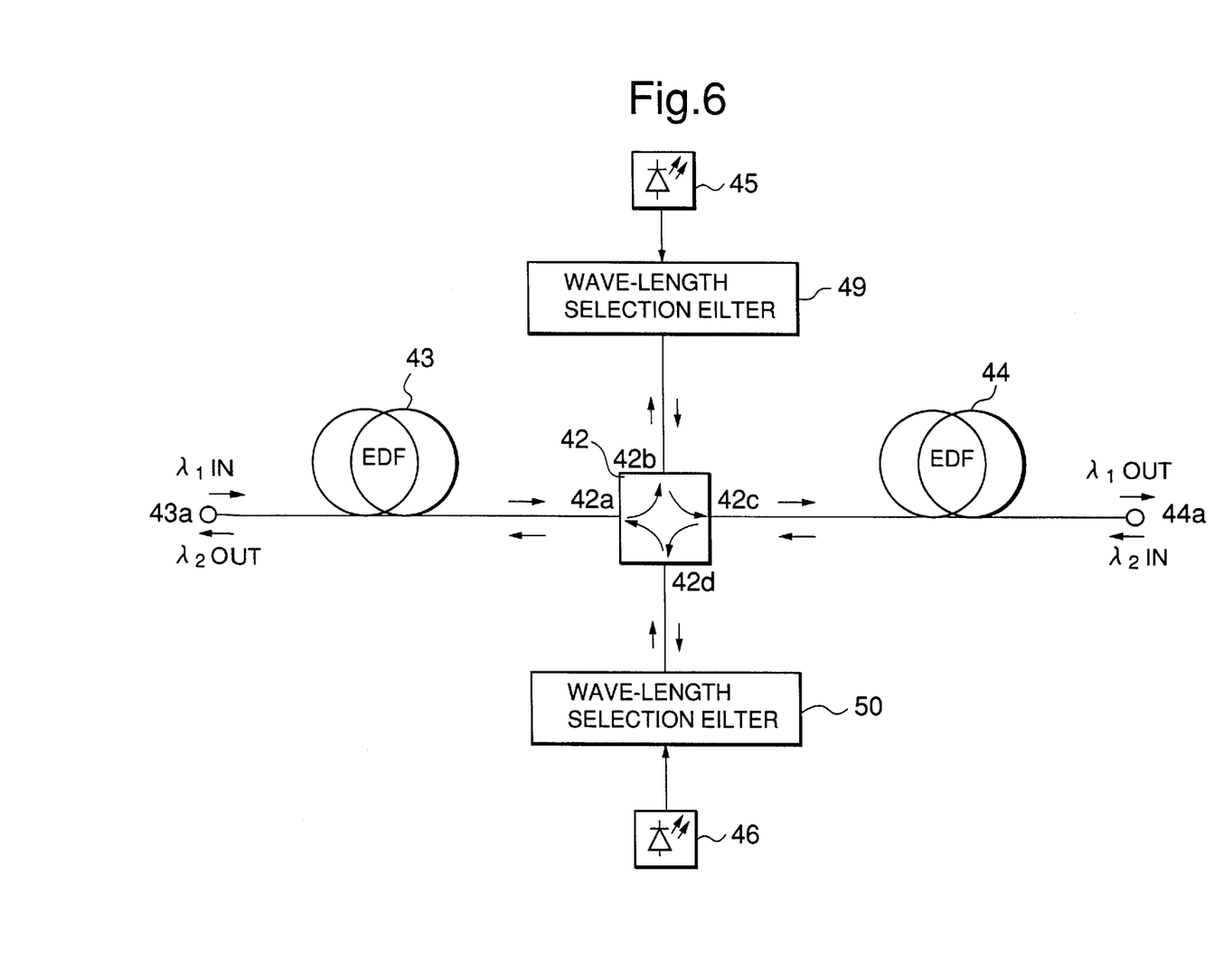
FIG. 6 shows the configuration of a bi-directional optical amplifier according to a fifth embodiment of the present invention.

Next, FIG. 6 shows the configuration of a bi-directional optical amplifier according to a fifth embodiment of the present invention. The bi-directional optical amplifier according to the embodiment of the present invention has a feature whereas the pumping light sources 45 and 46 are connected to the wave-length selection filters 49 and 50, respectively. In other words, they are prepared on opposite sides of the optical circulator 42. The wave-length selection filters 49 and 50 have a feature which reflects the specific wave-lengths of the first and second signal lights, respectively, while they pass the specific wave-lengths of the first and second pumping lights, respectively. A signal light in the 1.55 μm wave-length band and a pumping light in the 1.48 μm wave-length band are used in the embodiment. Therefore, the wave-length selection filters 49 and 50 have a feature of passing a light of 1.55 μm wave-length band, whereas they reflect a light of 1.48 μm in wave-length.

In the bi-directional optical amplifier of the embodiment, the first signal light entered the optical input/output terminal 43a propagates through the EDF 43. The signal light is reflected by the wave-length selection filter 49, via the optical circulator 42. On the other hand, the pumping light emitted from the pumping light source 45 passes through the wave-length selection filter 49. It, together with a signal light, then enters the EDF 44, via the optical circulator 42. Accordingly, excitation caused in EDF 44 by the pumping light emitted from the pumping light source 45, results in optically amplifying the signal light and outputting the resulting signal light.

The second signal light entering the optical input/output terminal 44a is also optically amplified and output from the optical input/output terminal 43a, resulting in the excitation of the EDF 43 made by the pumping light emitted from the pumping light source 46.

Throughout the above-mentioned operation, the signal lights entering the optical input/output terminals 43a and 44a, can each be optically amplified and output, in the same manner as is done in the first to fourth embodiments. Therefore, in this embodiment, the noise factor is reduced, which is the same as in the first embodiment. Moreover, since an optical coupler is not prepared in this embodiment, possible joint losses can be reduced.

In the aforementioned bi-directional amplifiers according to respective embodiments of the present invention, the material made by adding the Erbium(Er) to silica ($SiO_2$) optical fiber is used. However, possible materials used in the present invention are not limited to it. For example, another rare-earth element such as Neodymium(Nd) can be added to the optical fiber. Even in this configuration, similar results can be made.

As mentioned above, according to the bi-directional optical amplifiers of the present invention, a large amount of spontaneous emission lights is not amplified and output from the optical input/output terminal, unlike the conventional configuration. Accordingly, an additional optical filter is not required, and the optical transmission loss cannot be increased. Therefore, the noise factor is decreased, thereby successful optical transmission of high quality can be made.

Note that while this invention has been described in connection with certain preferred embodiments, it is to be understood that the subject matter encompassed by way of this invention is not to be limited to those specific embodiments.

On the contrary, it is not intended for the subject matter of the invention to include all alternative, modification and equivalents as can be included within the spirit and scope of the following claims.

What is claimed is:

1. A bi-directional optical amplifier, comprising:

an optical circulator, including four ports, a first to fourth ports, for outputting entered lights one after another to each adjacent port;

a first optical amplification fiber, connected to the first port, for optically amplifying the entered signal light with the help of a pumping light;

a first pumping light source for outputting a first pumping light;

a first wave-length selection/reflection means for selectively reflecting a specific wave-length of a first signal light;

a first optically coupling means, connected to the second port, for receiving the first signal light output from the second port, coupling the first pumping light with the first signal light reflected by the first wave-length selection/reflection means, and outputting the first signal light and the first pumping light to the second port;

a second optical amplification fiber, connected to the third port adjacent to the second port, for optically amplifying an entered signal light with the help of the pumping light;

a second pumping light source for outputting a second pumping light;

a second wave-length selection/reflection means for selectively reflecting a specific wave-length of a second signal light; and a second optically coupling means, connected to the fourth port, for receiving the second signal light output from the fourth port, coupling the second pumping light with the second signal light reflected by the second wave-length selection/reflection means; and outputting the second signal light and the second pumping light to the fourth port.

2. The bi-directional optical amplifier according to claim 1, wherein, the first optical amplification fiber and the second optical amplification fiber are a rare-earth element added optical fiber.

3. The bi-directional optical amplifier according to claim 1, wherein, the first wave-length selection/reflection means and the second wave-length selection/reflection means include a dielectric multi-layer film filter.

4. The bi-directional optical amplifier according to claim 1, wherein, the first wave-length selection/reflection means and the second wave-length selection/reflection means include an optical fiber grating.

5. The bi-directional optical amplifier according to claim 1, wherein, the first optically coupling means and the second optically coupling means are an optical coupler with a dielectric multi-layer film filter.

6. The bi-directional optical amplifier according to claim 1, wherein, the first optically coupling means and the second optically coupling means are a fiber fusion-spliced optical coupler.

7. A bi-directional optical amplifier, comprising:

an optical circulator, including four ports, a first to fourth ports, for outputting entered lights one after another to each neighboring port;

a first pumping light source for outputting a first pumping light;

a first optical amplification fiber for optically amplifying the entered signal light with the help of a pumping light;

a first optically coupling means, located between the first port and the first optical amplification fiber, for coupling a signal light propagated through the first optical amplification fiber with the first pumping light;

a first wave-length selection/reflection means, connected to the second port neighboring the first port, for selectively reflecting the specific wave-length of the first signal light;

a second pumping light source for outputting a second pumping light;

a second optical amplification fiber for optically amplifying an entered signal light with the help of a pumping light;

a second optically coupling means, located between the third port adjacent to the second port and the second optical amplification fiber, for coupling a signal light propagated through the second optical amplification fiber with the second pumping light; and a second wave-length selection/reflection means, connected to the fourth port adjacent to the third port, for selectively reflecting a specific wave-length of a second signal light.

8. The bi-directional optical amplifier according to claim 7, wherein, the first optical amplification fiber and the second optical amplification fiber are a rare-earth element added optical fiber.

9. The bi-directional optical amplifier according to claim 7, wherein, the first wave-length selection/reflection means and the second wave-length selection/reflection means include a dielectric multi-layer film filter.

10. The bi-directional optical amplifier according to claim 7, wherein, the first wave-length selection/reflection means and the second wave-length selection/reflection means are an optical fiber grating.

11. The bi-directiona optical amplifier according to claim 7, wherein, the first optical coupling means and the second optical coupling means are an optical coupler with a dielectric multi-layer film filter.

12. The bi-directional optical amplifier according to claim 7, wherein, the first optical coupling means and the second optical coupling means are a fusion-spliced optical coupler.

13. A bi-directional optical amplifier, comprising:

an optical circulator, including four ports, a first to fourth ports, for outputting entered lights one after another to each adjacent port;

a first pumping light source for outputting a first pumping light;

a first optical amplification fiber, one end of which is connected to the first port, for optically amplifying the entered signal light with the help of a pumping light;

a first optical coupling means, connected to the other end of the first optical amplification fiber, for coupling a signal light propagated through the first optical amplification fiber with the first pumping light;

a first wave-length selection/reflection means, connected to the second port adjacent to the first port, for selectively reflecting a specific wave-length of the first signal light;

a second pumping light source for outputting a second pumping light;

a second optical amplification fiber, one end of which is connected to the third port adjacent to the second port, for optically amplifying an entered signal light with the help of a pumping light;

a second optical coupling means, connected to the other end of the second optical amplification fiber, for coupling a signal light propagated through the second optical amplification fiber with the second pumping light; and a second wave-length selection/reflection means, connected to the fourth port adjacent to the third port, for selectively reflecting a specific wave-length of a second signal light.

14. The bi-directional optical amplifier according to claim 13, wherein, the first optical amplification fiber and the second optical amplification fiber are a rare-earth element added optical fiber.

15. The bi-directional optical amplifier according to claim 13, wherein, the first wave-length selection/reflection means and the second wave-length selection/reflection means include a dielectric multi-layer film filter.

16. The bi-directional optical amplifier according to claim 13, wherein, the first wave-length selection/reflection means and the second wave-length selection/reflection means are an optical fiber grating.

17. The bi-directional optical amplifier according to claim 13, wherein, the first optically coupling means and the second optically coupling means are an optical coupler with a dielectric multi-layer film filter.

18. The bi-directional optical amplifier according to claim 13, wherein, the first optical coupling means and the second optical coupling means are a fusion-spliced optical coupler.

19. A bi-directional optical amplifier, comprising:
an optical circulator, including four ports, a first to fourth ports, for outputting lights entered one after another to each adjacent port;
a first optical amplification fiber, one end of which is connected to the first port, for optically amplifying the signal light entered with the help of a pumping light;
a first pumping light source for outputting a first pumping light;
a first wave-length selection means, located between the second port adjacent to the first port and the first pumping light source, for selectively reflecting a specific wave-length of a first signal light, and passing the first pumping light;
a second optical amplification fiber, one end of which is connected to the third port adjacent to the second port, for optically amplifying a signal light entered with the help of a pumping light;
a second pumping light source for outputting a second pumping light; and
a second wave-length selection means, located between the fourth port adjacent to the third port and second pumping light source, for selectively reflecting a specific wave-length of a second signal light, and passing the second pumping light.

20. The bi-directional optical amplifier according to claim 19, wherein, the first optical amplification fiber and the second optical amplification fiber are a rare-earth element added optical fiber.

21. The bi-directional optical amplifier according to claim 19, wherein, the first wave-length selection/reflection means and the second wave-length selection/reflection means include a dielectric multi-layer film filter.

22. The bi-directional optical amplifier according to claim 20, wherein, the first wave-length selection means and the second wave-length selection means are an optical fiber grating.

23. The bi-directional optical amplifier according to claim 21, wherein, the first optical coupling means and the second optical coupling means are an optical coupler with a dielectric multi-layer film filter.

24. The bi-directional optical amplifier according to claim 22, wherein, the first optical coupling means and the second optical coupling means are a fusion-spliced optical coupler.

* * * * *